United States Patent
Midoun et al.

(10) Patent No.: US 8,985,258 B1
(45) Date of Patent: Mar. 24, 2015

(54) VEHICLE FRAME COMPONENT

(71) Applicant: Ford Global Technologies, LLC, Dearborn, MI (US)

(72) Inventors: Djamal Eddine Midoun, Ann Arbor, MI (US); Jamil M. Alwan, Ann Arbor, MI (US); Jonatan Leff Yaffe, Mexico City (MX); Joe L. Buchwitz, Huntington Woods, MI (US); David Burgess, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/291,700

(22) Filed: May 30, 2014

(51) Int. Cl.
*B62D 21/15* (2006.01)
*B62D 25/08* (2006.01)
*B60R 19/16* (2006.01)

(52) U.S. Cl.
CPC ............ *B62D 25/082* (2013.01); *B62D 21/152* (2013.01); *B60R 19/16* (2013.01)
USPC .......................... 180/274; 296/187.1; 293/149

(58) Field of Classification Search
CPC .... B62D 21/00; B62D 21/152; B62D 21/155; B62D 25/08; B62D 25/082; B60R 19/42; B60R 19/16; B60R 2019/002
USPC .................... 180/274, 311; 293/38, 114, 149; 296/187.1
See application file for complete search history.

(56) References Cited

U.S. PATENT DOCUMENTS

| | | | |
|---|---|---|---|
| 5,275,436 A * | 1/1994 | Pomero | 280/784 |
| 6,286,867 B1 * | 9/2001 | Braemig et al. | 280/784 |
| 6,364,358 B1 | 4/2002 | Miller | |
| 6,511,119 B2 * | 1/2003 | Takase et al. | 296/187.09 |
| 6,866,115 B2 * | 3/2005 | Miyasaka | 180/311 |
| 6,994,374 B2 * | 2/2006 | Miyasaka | 280/784 |
| 7,819,218 B2 * | 10/2010 | Eichberger et al. | 180/274 |
| 8,480,130 B2 * | 7/2013 | Dandekar et al. | 280/784 |
| 8,602,458 B2 | 12/2013 | Rodgers et al. | |
| 8,608,231 B1 * | 12/2013 | Mendivil et al. | 296/187.03 |
| 2010/0327626 A1 * | 12/2010 | Baumann | 296/187.09 |

(Continued)

FOREIGN PATENT DOCUMENTS

| | | |
|---|---|---|
| DE | 102012004683 | 9/2013 |
| EP | 0921051 | 6/1999 |
| WO | WO 2014015094 | 1/2014 |

OTHER PUBLICATIONS

Meyerson et al., "Evaluation of Advanced Compatibility Frontal Structures Using the Progressive Deformable Barrier (PDB)", Paper No. 09-0329 (2009); 15 pps.

(Continued)

*Primary Examiner* — Paul N Dickson
*Assistant Examiner* — Timothy Wilhelm
(74) *Attorney, Agent, or Firm* — Raymond L. Coppiellie; Bejin Bieneman PLC

(57) ABSTRACT

A body on frame vehicle includes a vehicle frame having a small offset impact load management system including upper and lower rear blocker structures and a reinforcement blocker structure for managing impact loads applied to the wheel and tire of the vehicle from being directed further toward the body. The reinforcement blocker structure includes a base member welded to openings in the frame side rail and extending angularly outwardly and located rearward and distal the wheel and tire and proximal a longitudinal cross frame member for transferring the small offset impact loads transferred by the wheel and tire in a cross vehicle direction.

4 Claims, 15 Drawing Sheets

(56) References Cited

U.S. PATENT DOCUMENTS

2012/0313360 A1 12/2012 Akaki et al.
2013/0341969 A1 12/2013 Fujii et al.

OTHER PUBLICATIONS

Paine et al., "Offset Crash Tests—Observations About Vehicle Design and Structural Performance", Paper No. 98-S1W-21 (1998); 5 pps.

* cited by examiner

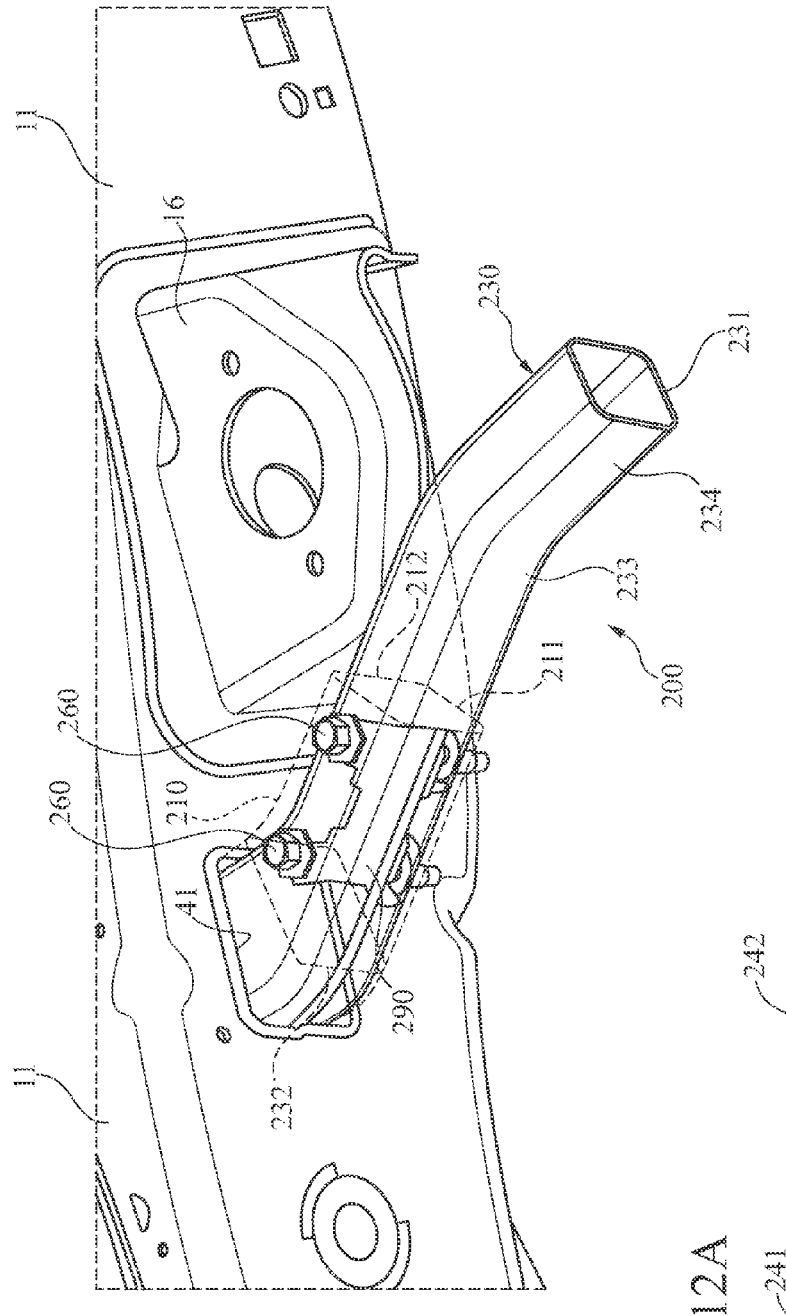
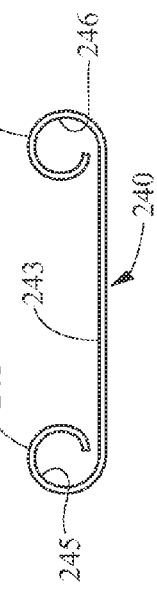
Fig. 12
Fig. 12A

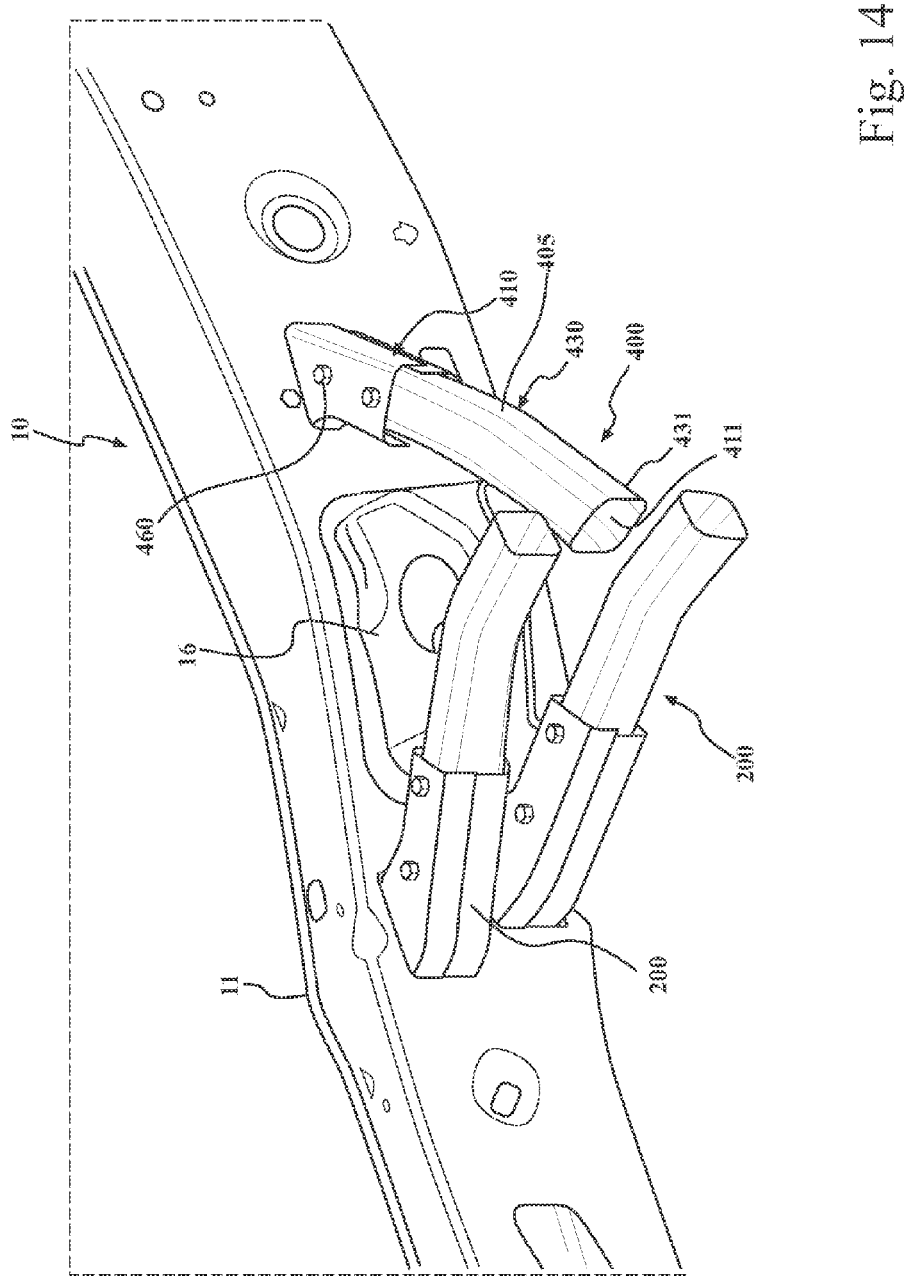

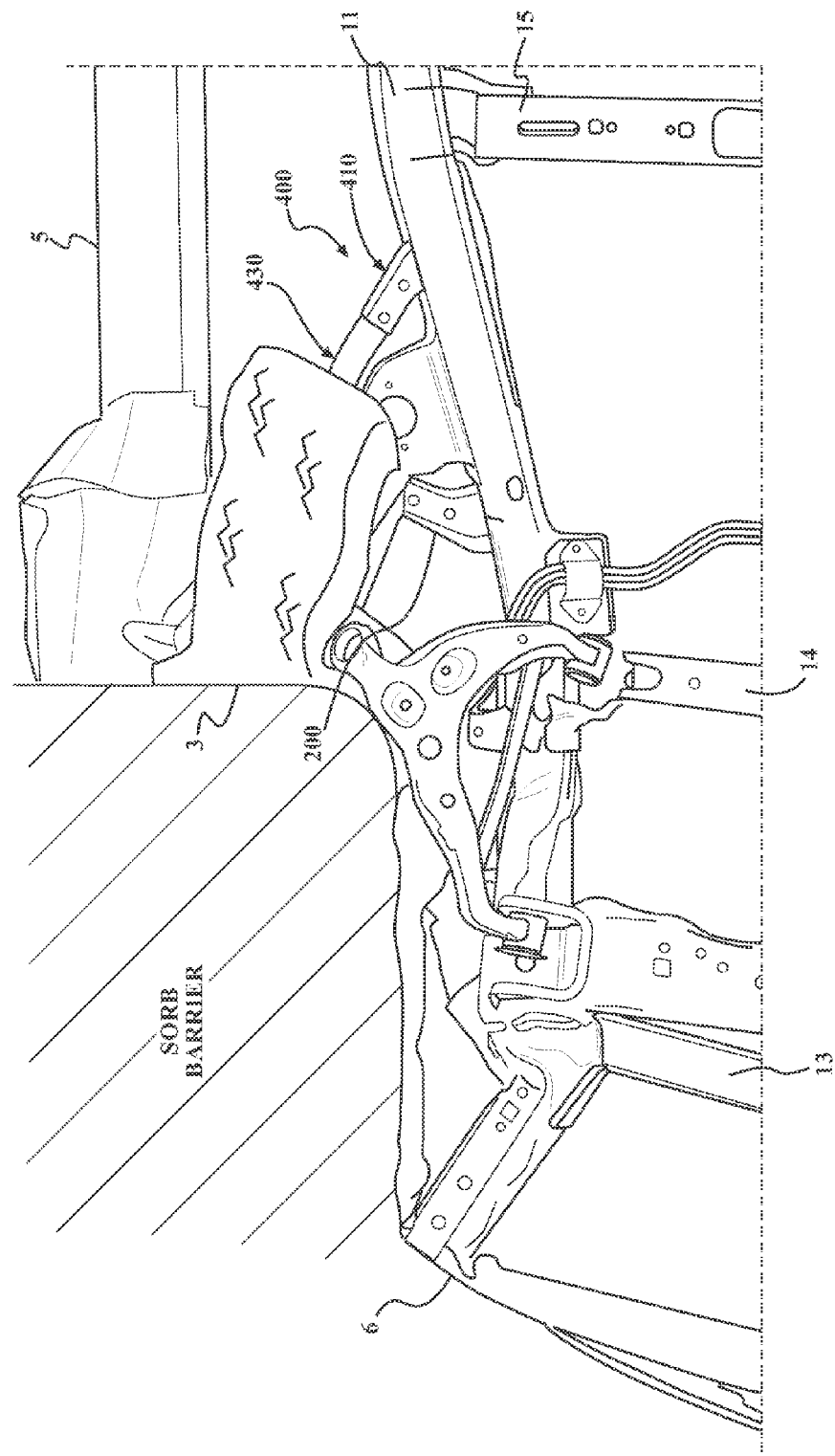

VEHICLE FRAME COMPONENT

BACKGROUND

It is generally known to provide a vehicle including a vehicle frame assembly of any known or appropriate type such as a unitary body or a body on frame assembly. It is also generally known to provide a vehicle including various structures for improving the performance of the vehicle during a variety of types of impacts to the vehicle. The performance of a vehicle and its various structures, assemblies and components from an impact may be assessed using a variety of crash tests and analytical methodologies.

A frontal crash having a relatively small amount of overlap may be designed to attempt to replicate what may happen when only a relatively small portion of the front corner of a vehicle collides with another object like a vehicle, tree, utility pole or the like. One known industry test is the small overlap rigid barrier (SORB) test. In the SORB test, a vehicle travels at 40 mph toward a 5-foot-tall rigid barrier and only the outer 25% of the vehicle width is impacted into the barrier. It is generally understood that most modern vehicles may be designed to have safety cages and other structures, assemblies and components for protecting the occupant compartment and built to help manage energy with controlled and limited deformation to the vehicle during a variety of impacts to the vehicle from most direction, including a head-on and overlap frontal crashes. The crush zones of the main body and frame structures are designed to manage the crash energy to reduce forces on the occupant compartment and its occupants. When a crash involves these structures, the occupant compartment may generally be protected from intrusion, and the airbags and safety restraints may perform to restrain and help protect vehicle occupants.

Small overlap frontal crashes primarily affect a vehicle's outer edges, which may not be directly protected by some of the primary crush-zone structures. In such a scenario, crash forces may go directly into the front wheel, suspension system and potentially the vehicle firewall and body including the passenger compartment. In a small overlap crash which does not engage the main structures of the vehicle it may be possible for the wheel to be forced rearward toward the passenger compartment of the body of the vehicle.

The wheel may be trapped between the rigid barrier and the body structure thus applying local loads that may surpass steel or aluminum structure material strengths. This is notably different since the understood prior art devices are designed and intended to prevent the wheel from moving, turning or twisting during a frontal impact and/or SORB testing. Without this invention, the wheel can get trapped between the rigid barrier and the body structure that applies local loads that may surpass steel or aluminum structure material strengths.

Even though such crush-zone and body (or body) on frame type structures have been known and may have some certain advantages, there remains a continuing and significant need to provide improved impact or crush performance structures having a lower cost structure and having optimized structural efficiencies. In body-on-frame vehicle architectures, particularly as the vehicle weight increases (such as with larger trucks), it has recently been noticed that the effectiveness of any vehicle wheel kinematics modifiers becomes reduced. There remains a significant need to address the wheel load path as it contacts the backup structure at unfavorable angles presenting a risk for increased intrusion in the dash area and the lower compartment negatively affecting the IIHS SORB structural and overall rating performance. In particular, there remains a continuing and significant need to provide additional improved impact performance in a vehicle that will include reducing intrusion of the forward structures, including in particular the wheel and tire of the vehicle, into the body or occupant compartment of the vehicle.

DRAWINGS

FIG. 12 is partial, graphic perspective view of the rear blocker structure of the exemplary embodiment of FIG. 3;

FIG. 12A is top plan graphic view of the clip support structure of the exemplary embodiment of FIG. 12;

FIG. 14 is a partial, perspective graphic view of the small offset impact load management system and reinforcement blocker structure of FIG. 13 according to an exemplary embodiment of the present disclosure.

FIG. 15 is a bottom, plan graphic view of the body on frame vehicle of FIG. 13 showing the small offset impact load management system and reinforcement blocker structure after a SORB impact.

DETAILED DESCRIPTION

Figure 2:
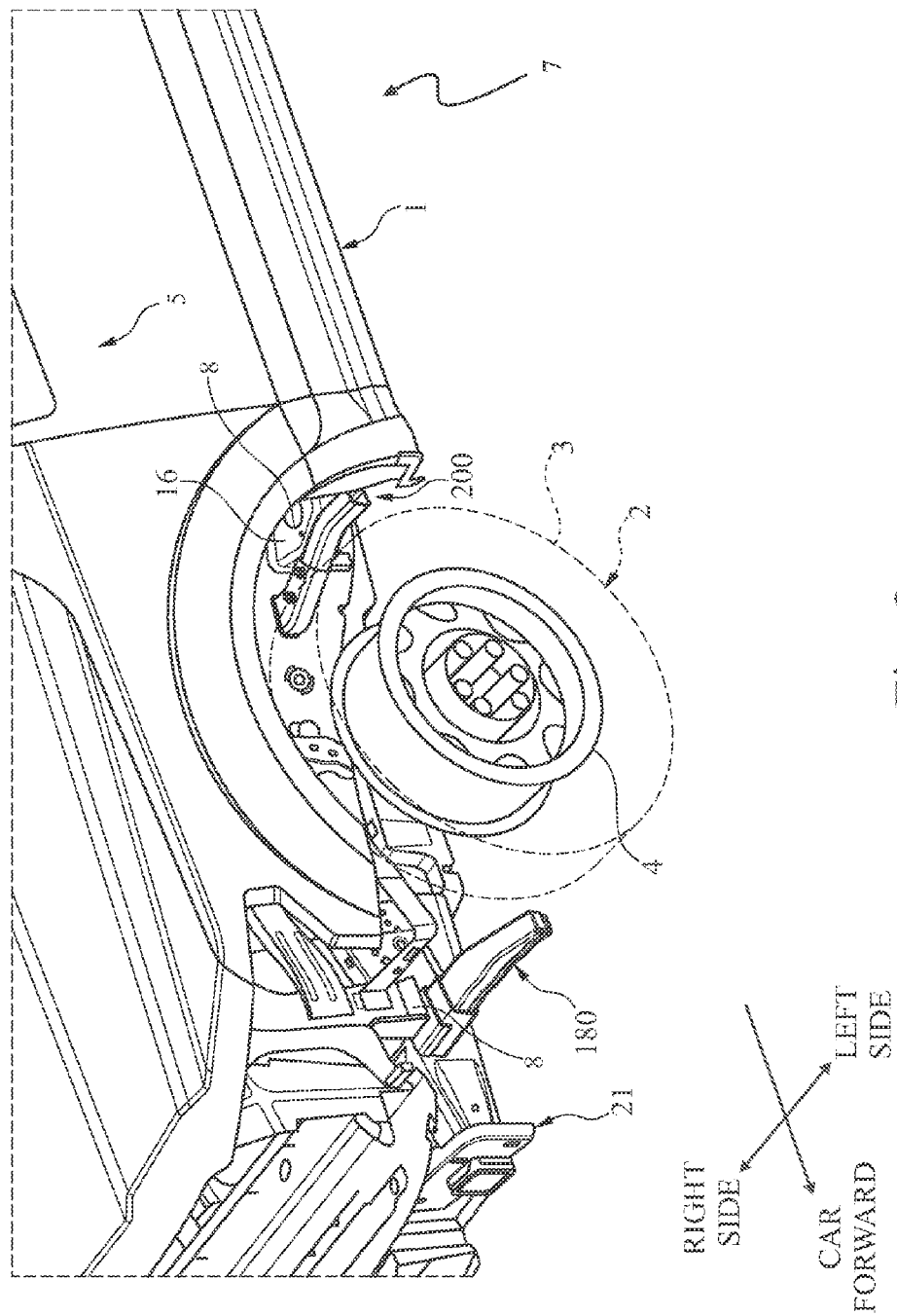
FIG. 2 is a partial, perspective graphic view of a vehicle including front and rear tire blocker structures according to an exemplary embodiment of the present disclosure.
Figure 3:
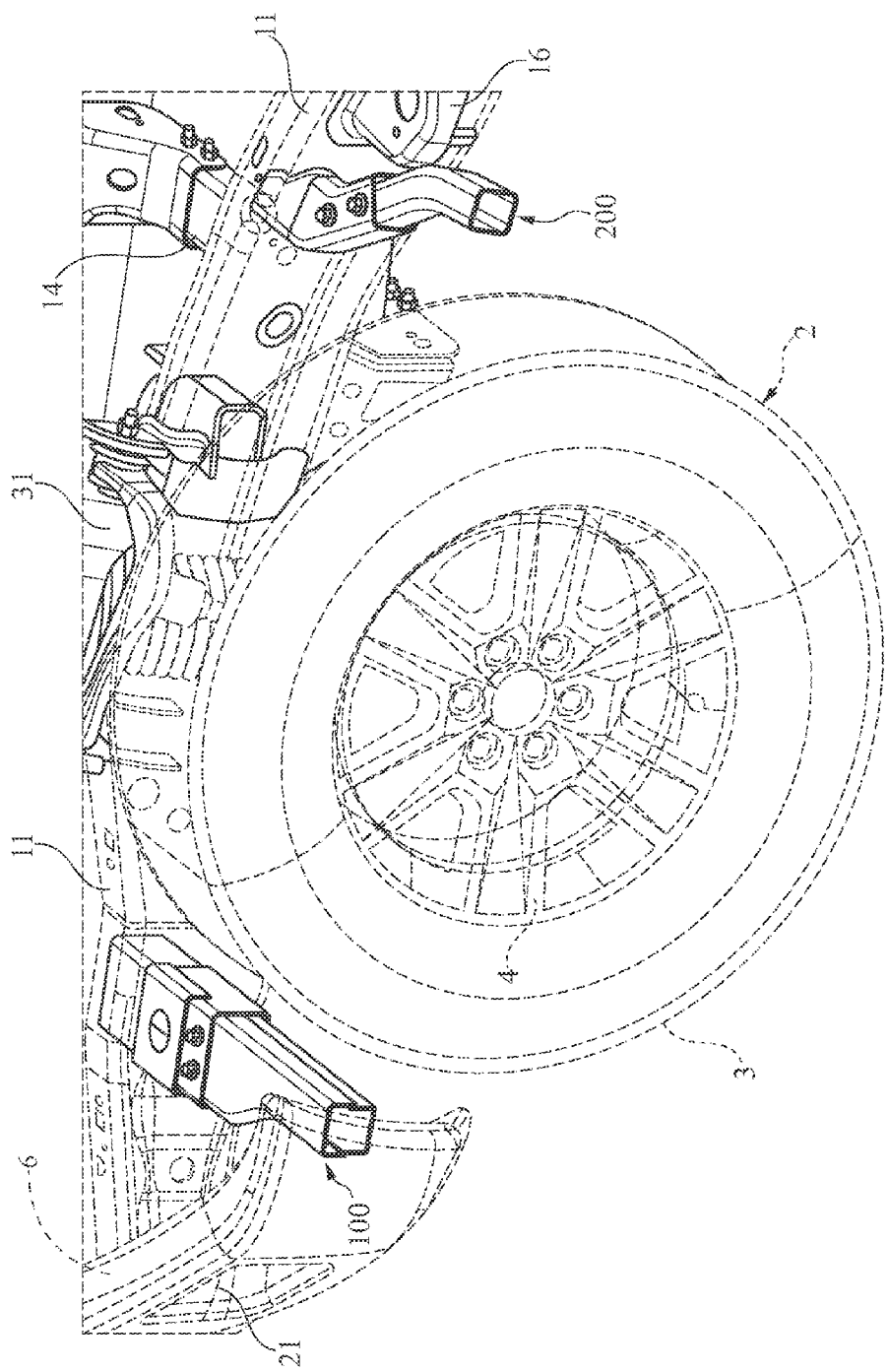
FIG. 3 is a perspective graphic view of front and rear tire blocker structures according to an exemplary embodiment of the present disclosure.

Referring in general to all of the Figures and in particular to FIGS. 3 through 10, there is disclosed in an exemplary embodiment of a portion of a vehicle 1. The vehicle 1 may include a wheel 2 for providing mobility to the vehicle 1. The wheel 2 may include a tire 3 and a rim 4. The vehicle 1 may include a vehicle frame 10 and a body 7 as best shown in FIG. 2. Accordingly, the vehicle 1 has a body (or cab) on frame construction such as may be known for use as a pickup truck, sport utility, cross over or any other similar vehicle. The vehicle 1 further includes a bumper or impact absorber 6 located at the car forward end of the vehicle 1. Referring now with a particular focus on FIG. 4, it may be observed that the vehicle frame 10 may include right-side and left-side side beams, frame rails or members 11 and 12, respectively, as may be generally known for a body on frame type vehicle 1. It should be noted that the frame side rails 11 and 12 generally extend in a direction aligned with the car forward direction of vehicle 1 is identified by the directional arrows on the left side of FIGS. 2 and 4.

The vehicle frame 10 further includes a plurality of cross members for coupling the left and right (or first and second) side rail frame members 11 and 12, respectively. A first cross frame member 13 is located proximal the car forward direction and extends between the left-side frame rail 11 and the right-side frame rail 12. A second cross frame member 14 also extends between the left-side frame rail 11 and the right-side frame rail 12 at a location rearward of the cross frame member 13 and generally aligned with and proximal the wheels 2 of the vehicle 1. A third cross frame member 15 extends between the left-side frame rail 11 and the right-side frame rail 12 and generally distal the second cross frame member 14 in a vehicle rearward direction and generally aligned under the body or passenger compartment 5 of the vehicle 1. The cross frame members 13, 14 and 15 extend longitudinally and the cross car direction and are coupled to the left-side frame rail 11 and the right-side frame rail 12 using any known or appropriate structure or process.

Figure 4:
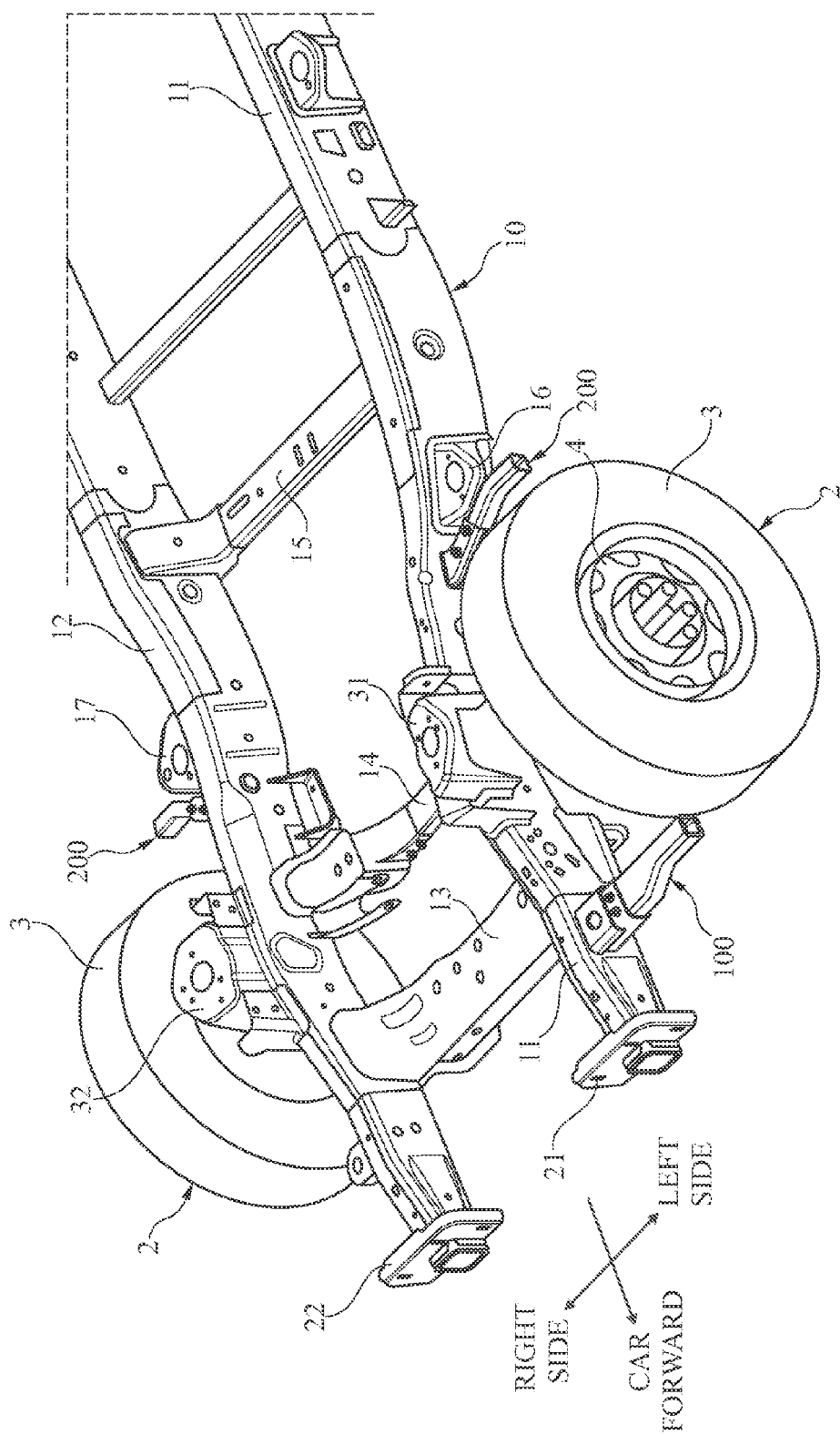
FIG. 4 is a partial, perspective graphic view of the exemplary embodiment of FIG. 3 with the vehicle body structure removed and showing the frame.
Figure 5:
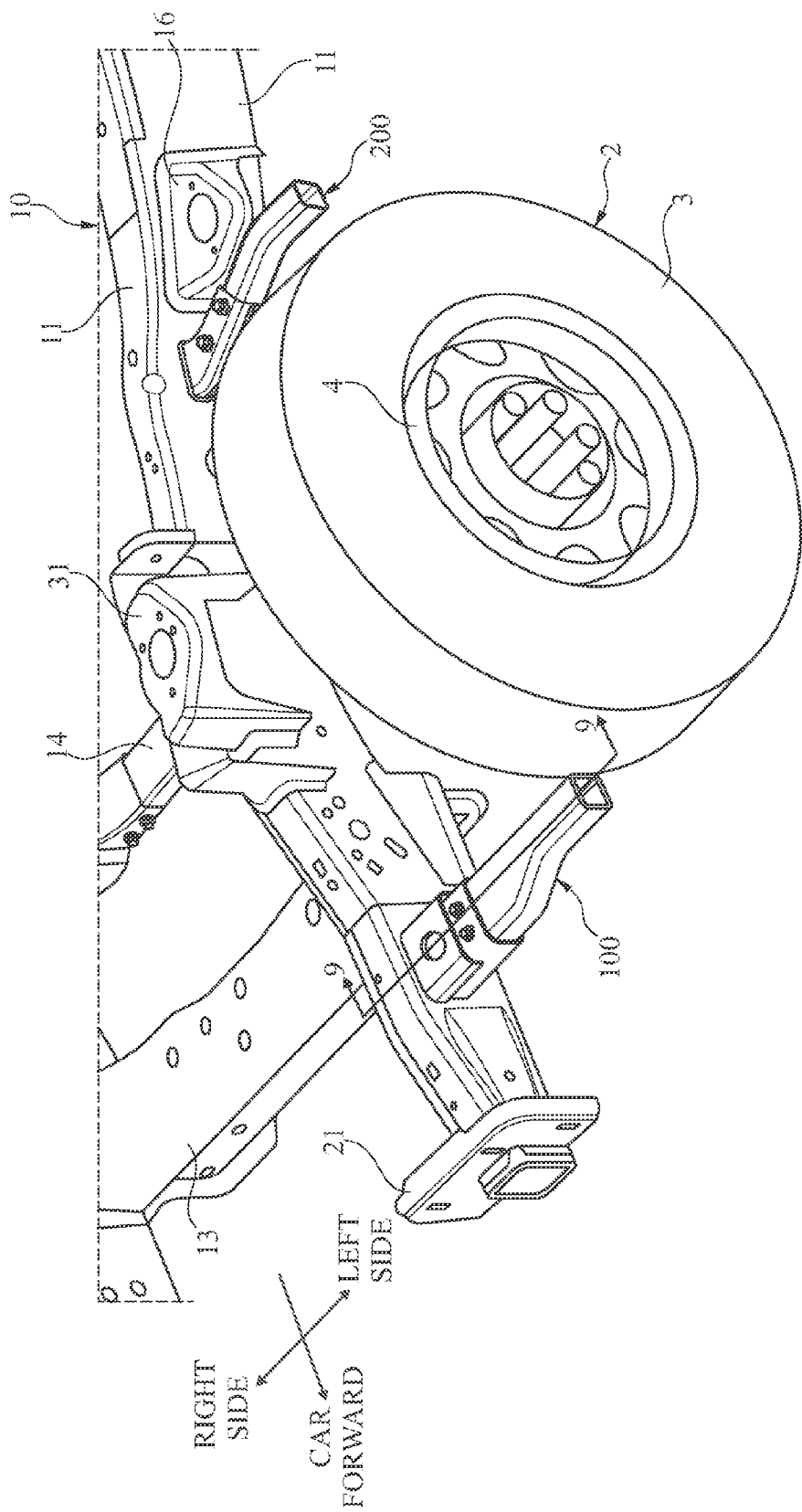
FIG. 5 is a partial, perspective graphic view of the exemplary embodiment of FIG. 3.

The vehicle frame 10 may further include left-side and right-side body mount brackets 16 and 17, respectively, located proximal the second and third cross frame members 14 and 15, respectively, and coupled to the left-side and right-side side frame rails 11 and 12, respectively as best shown in FIG. 4. Each of the body mount brackets 16 and 17 may include a passage or hole for receiving a post or other extension member of the body 7 for coupling the body 7 to the vehicle frame 10. The vehicle frame 10 may further include a pair of left-side and right-side shock tower brackets 31 and 32, respectively, located proximal the wheels 2 and between the first and second cross frame members 13 and 14, respectively, and coupled to the left-side and right-side side frame rails 11 and 12, respectively. The left-side and right-side shock tower brackets 31 and 32 may each include a passage or hole receiving a poster other extension member of the body 7 for coupling the body 7 to the vehicle frame 10. The vehicle frame 10 may further include left-side and right-side front impact absorber or bumper mount brackets 21 and 22, respectively, coupled to the car forward ends of the left-side and right-side side frame rails 11 and 12, respectively. The vehicle frame 10 and its various components may be preferably made from a high strength and/or ultra-high strength steel and may be coupled together using known or appropriate fastening or coupling structure or process, including in particular a metal inert gas (MIG) welding process.

Figure 1:
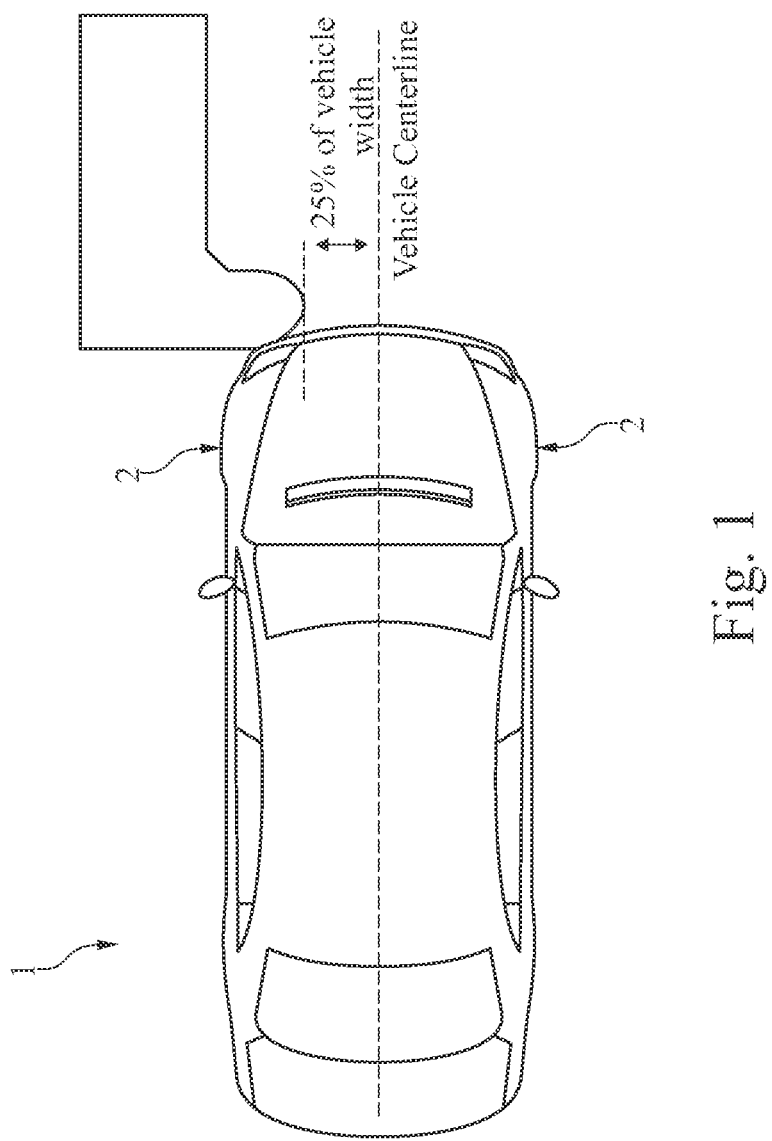
FIG. 1 is an overhead graphic view of a small overlap rigid barrier (SROB) frontal crash test simulation including a vehicle.
Figure 8:
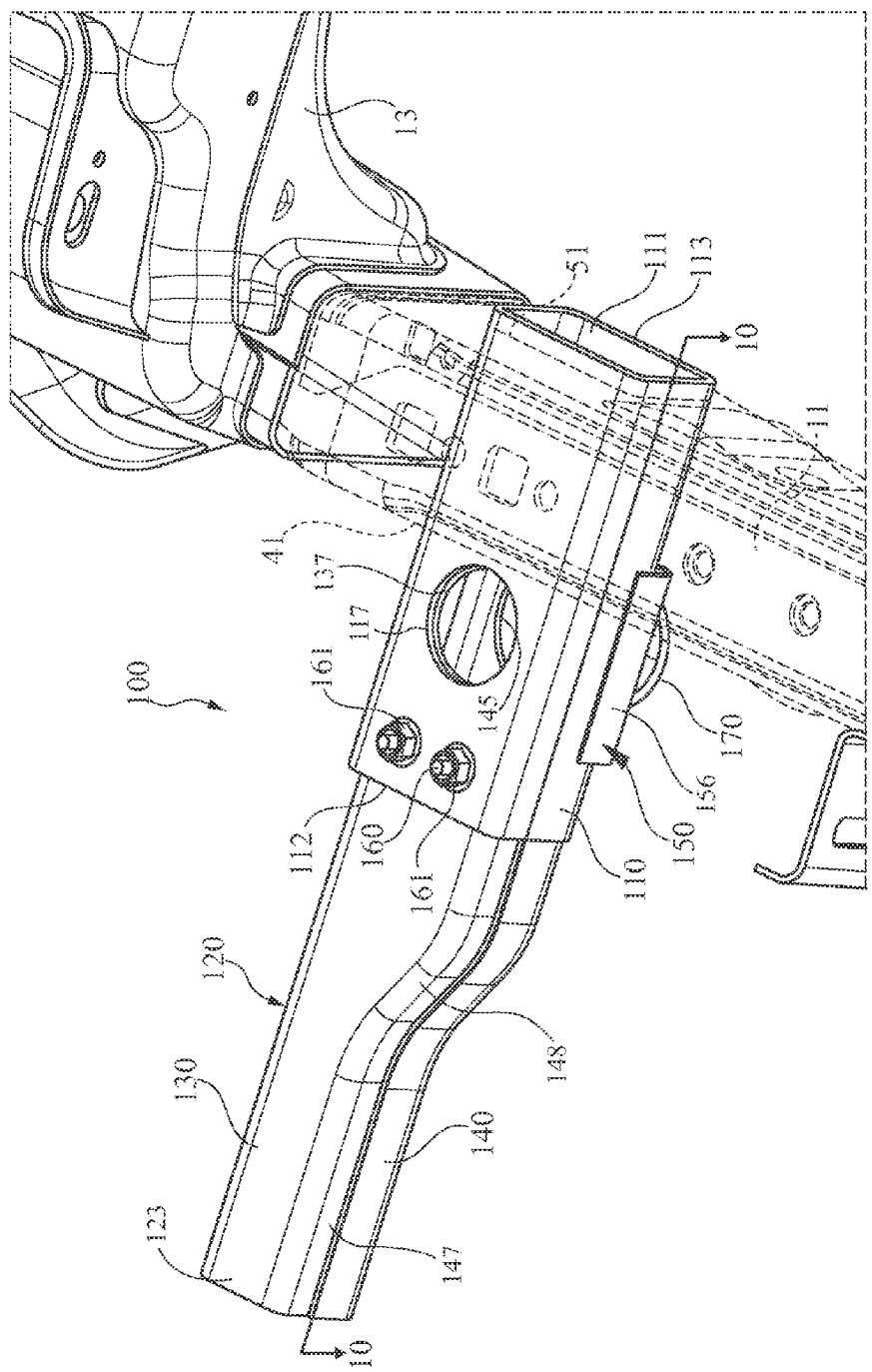
FIG. 8 is an alternate partial, perspective graphic view of the exemplary embodiment of FIG. 6 detailing the integration of the front blocker structure with the side frame rail of the vehicle frame.

The vehicle frame 10 may further include left-side and right-side front blocker structures 100 and left-side and right-side rear blocker structures 200 coupled to the left side and right side frame members 11 and 12, respectively. The front blocker structure 100 is coupled to the side frame rail 11 at a location car forward and proximal the wheel 2. The left side vehicle frame rail 11 includes a first hole or passage 41 and the left side wall of the frame rail 11 includes a second hole or passage 51 in the right side wall of the frame 11. The front blocker structure 100 is located in and extends through the first passage 41 and the second passage 51 as best shown in FIG. 8. The front blocker structure 100 extends in a direction substantially aligned with the cross car direction (which is normal or perpendicular to the car forward direction) and outward from the frame rail 11 such that in a small offset frontal impact (where the impact is less than 25% of the vehicle width (see FIG. 1)), the front blocker structure 100 will be impacted before the wheel 2. Since the front blocker structure 100 is coupled to the left side vehicle frame rail 11, at least a portion of the energy of the small offset impact will be transferred to the left side frame rail 11 and therefore not transferred to the wheel 2. Since there is less energy transferred to the wheel 2, there will be less energy to move the wheel 2 toward the body 7 of the vehicle 1 and therefore there will necessarily be less intrusion of the occupant compartment 5. Accordingly, it may be appreciated that the front blocker structure 100 may function to limit, and to control and guide the movement of the wheel 2 during a small offset impact to the vehicle 1.

Figure 6:
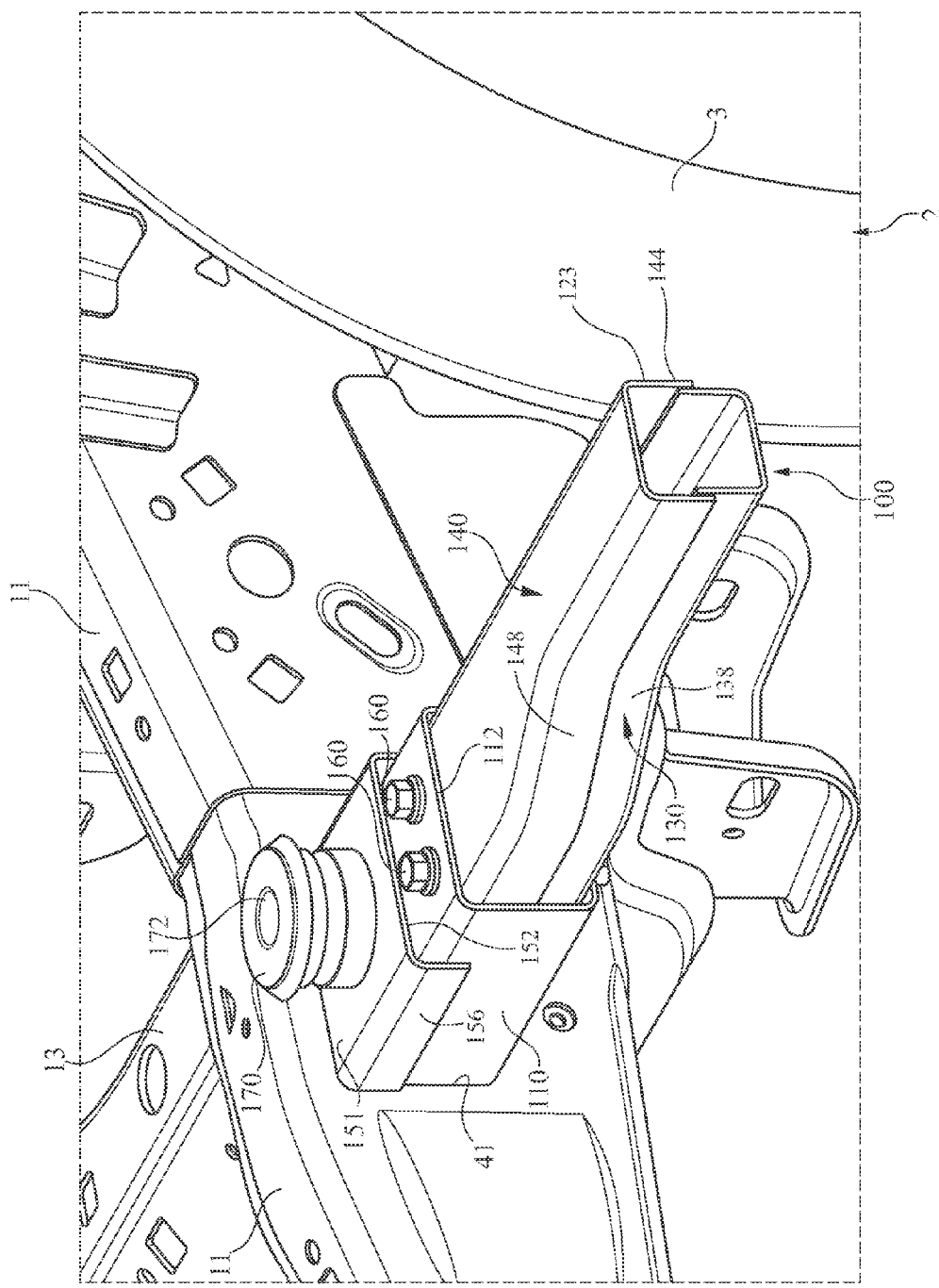
FIG. 6 is a partial, perspective graphic view of the front blocker structure according to the exemplary embodiment of FIG. 3.
Figure 7:
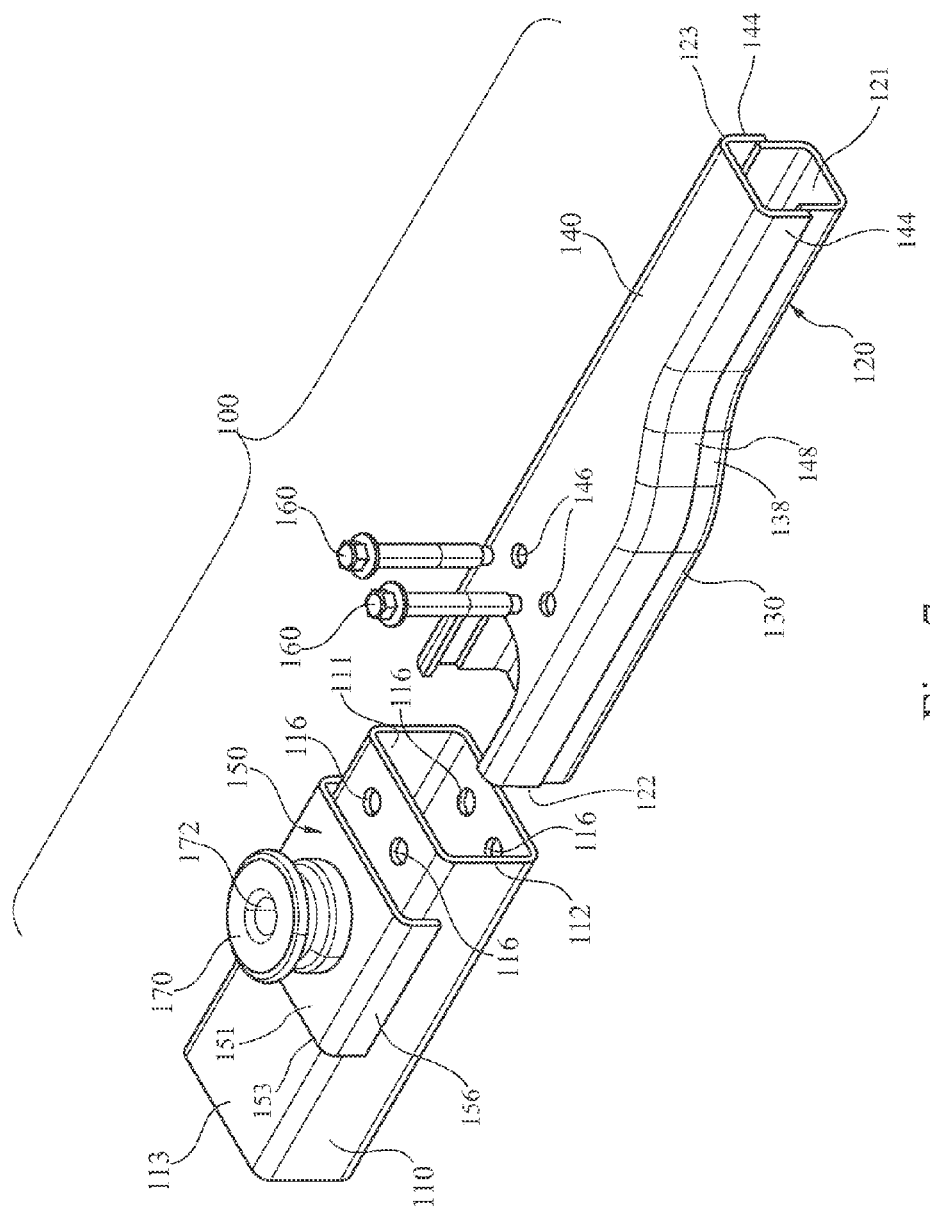
FIG. 7 is a partially exploded, perspective view detailing the components of the front blocker structure of FIG. 6.
Figure 9:
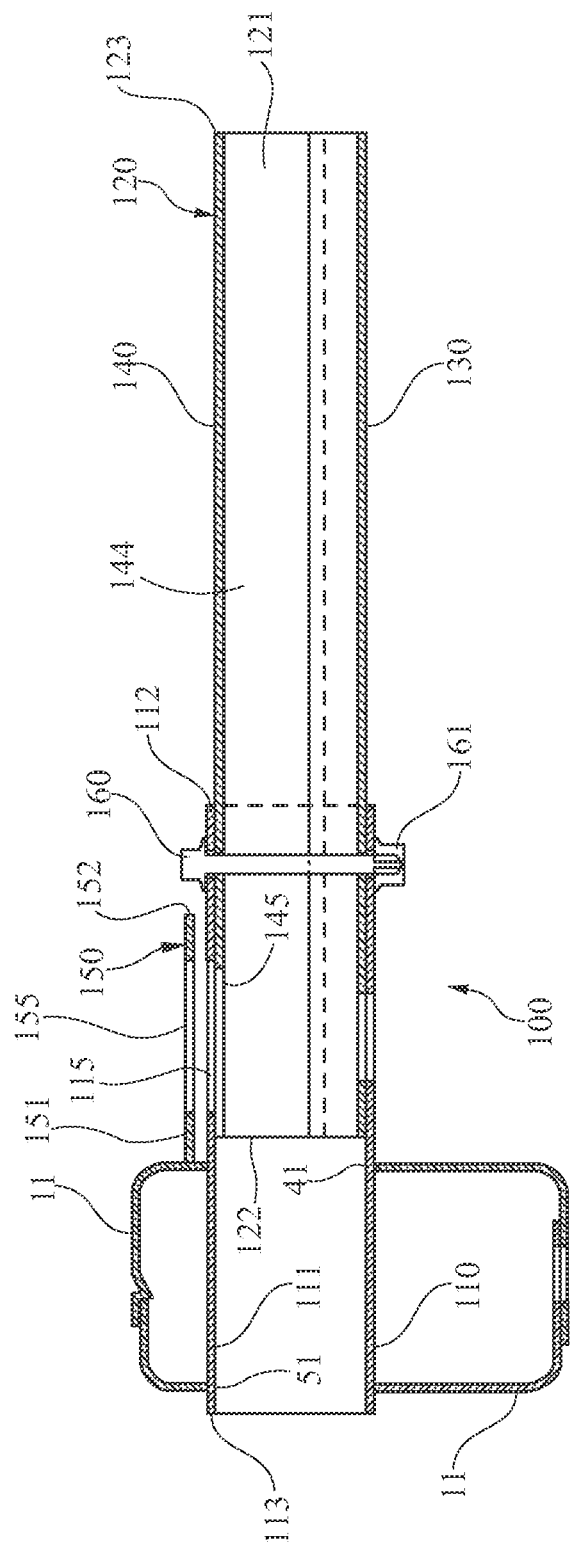
FIG. 9 is a graphic section view of the exemplary embodiment of the blocker structure of FIG. 5 taken along the line 9-9 shown therein.
Figure 10:
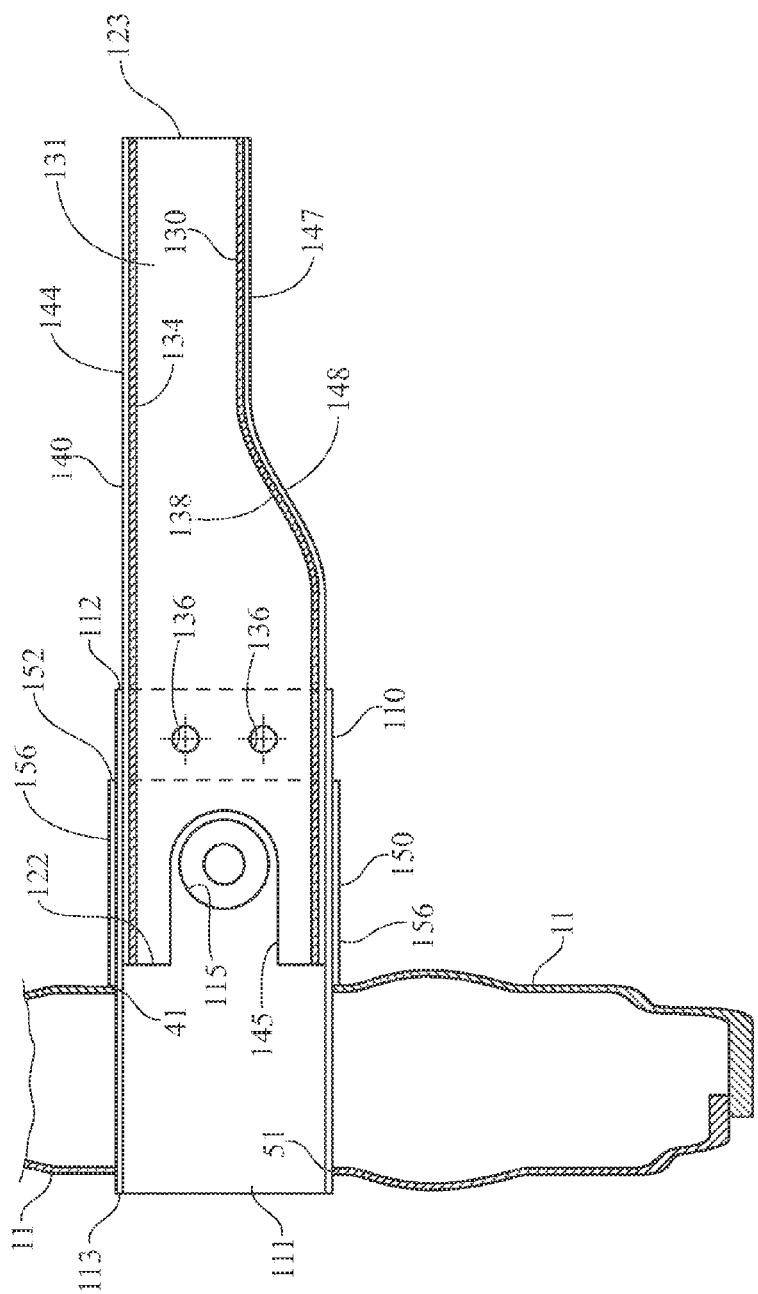
FIG. 10 is a partial, graphic section view of the exemplary embodiment of the blocker structure of FIG. 8 taken along the line 10-10 shown therein.

Referring more particularly known to FIGS. 7 through 10, the details of the front blocker structure 100 are shown. In particular, the front blocker structure 100 includes a base member 110 and an extension member 120. The front blocker structure 100 may also include, in one particular exemplary embodiment, a body mount bracket or base member 150 coupled to the base member 110. The body mount bracket 150 may preferably be a stamped high strength or ultrahigh strength steel material that includes a generally planar middle portion 151 and depending or folded legs 156. The middle portion 151 and the legs 156 may preferably be sized to correlate with the outer perimeter of the base member 110. The mounting bracket 150 includes a first end 152 and a second end 153 as best shown in FIGS. 6 and 7. The mounting bracket 150 may further include an opening, hole or passage 155 in the planar middle portion 151. The hole 155 may preferably be aligned with the hole 115 in the base member 110 and the passage 145 in the extension member 120 as best shown in FIG. 9. In one exemplary embodiment according to the present disclosure, the distal ends of the legs 156 may be welded to the outer periphery of the base member 110 using a MIG welding process.

In one particular exemplary embodiment, the base member 110 of the front blocker structure 100 may be a generally tubular structure made from a high strength or ultrahigh strength steel using a stamping, forming and welding process or any other known and appropriate process for producing an object from such material. The base member 110 includes a first end 112 and a second end 113 and has a generally longitudinal extent there between defining a generally longitudinal axis. The base member 110 has a generally rectangularly shaped cross-section in a direction perpendicular to the longitudinal axis but may have other known and appropriate cross-section shapes. The base member 110 has a generally tubular shape including a cavity, chamber or passage 111 extending from the first end 112 to the second end 113. The base member 110 further includes a plurality of holes or passages 116 in its upper and lower surfaces and located proximal the end 112. The base member 110 is coupled by welding to the left side frame rail 11, as best shown in FIGS. 8 and 9.

The base member 110 of the front blocker structure 100 is welded to the holes 41 and 51 in the left side frame rail 11. The end 113 of the base member 110 may extend inboard of the left side frame rail 11 in the cross car direction a sufficient amount such that a MIG weld may be formed around the entire perimeter of the base member 110 and the opening hole 51 of the left side frame rail 11. Similarly, a MIG weld may be formed around at least a portion of (or alternatively the perimeter of the base 110 and the opening hole 41 of the left side frame rail 11 to securely couple the base member 110 of the front blocker structure 100 to the vehicle frame 10. Alternatively the weld may be of any known or appropriate type and may be formed around the entire perimeter of the openings 41 and 51. The base member 110 further includes an opening or hole or passage 115 in the upper surface and located between the first end 112 and the second end 113. The base member 110 further includes an opening or hole or passage 117 in the lower surface and located between the first end 112 and the second end 113 and the hole 117 is generally aligned and overlapping with the hole 115 to provide the ability for a structure (such as a mounting post of the body 7) and assembly tools to pass through the components of the base member 110.

The front blocker structure 100 may further include the extension member 120 which may be coupled to the base member 110. In one particular exemplary embodiment according to the present disclosure, the extension member 120 may include a first or bottom portion 130 and a second or upper portion 140 as best shown in FIGS. 7 through 10. The extension member 120 may be preferably coupled to the first end 112 of the base member 110 using any known or appropriate type of removable coupling, such as the fasteners 160. The extension member 120 has a generally longitudinal extent from a first end 122 to a second end 123. The extension member 120 has a generally tubular construction including a generally longitudinal axis and having a generally rectangularly shaped cross section in a direction perpendicular to the longitudinal axis of the extension member 120. Notably differing from the base member 110 which has a generally constant cross-section in a direction perpendicular to its longitudinal axis, the extension member 120 has a generally varying sized cross-section in a direction perpendicular to its longitudinal axis. The extension member 120 may have either a constant or a varied size cross-section (or a combination thereof) in a direction perpendicular to its longitudinal axis. Accordingly, the extension member 120 may include a generally hollow passage or chamber 121 extending from the first end 122 to the second end 123. The outer perimeter of the first end 122 of the extension member 120 may preferably be sized and shaped to be quickly and securely received in the passage 111 of the base member 110.

The first or bottom portion 130 of the extension member 120 may be formed from a high strength or ultrahigh strength steel in a stamping procedure to include a first surface 131 having a generally planar extent and including a pair of depending side extensions 134 and 137. The width of the first surface 131 varies between the first end 122 and the second end 123 of the bottom portion 130. The second or upper portion 140 of the extension member 120 may also be formed from a high strength or ultrahigh strength steel in a stamping procedure to include a first surface 141 having a generally planar extent and including a pair of depending side extensions 144 and 147 having complementary shapes to the depending side extensions 134 and 137 of the bottom portion 130. Since the depending side portions 144 and 147 overlap with at least a portion of the depending side extensions 134 and 137 of the bottom portion 130, the first surface 131 of the bottom portion 130 generally has the matching shape to the first surface 141 of the upper portion 140 but may be slightly larger. Accordingly, the extension member 120 may be assembled by producing the bottom portion 130, the top portion 140 and coupling the portions together and then welding them using a MIG welding or similar process.

In one exemplary embodiment according to the present disclosure, the first surface 141 of the upper portion 140 may include a passage or opening 145 extending from the first end 122 and toward the second end 123. The opening 145 in the upper surface 141 of the upper or top portion 140 of the extension member 120 overlaps with at least a portion of the openings 115 and 117 in the upper and lower surfaces, respectively, of the base member 110. Accordingly, as may be best seen in FIG. 9, the mounting post eight of the body 7 is may extend through openings in the base member 110 and the extension member 120 so the body 7 may be secured to the vehicle frame 10.

In one exemplary embodiment according to the present disclosure, the first surface 141 of the upper portion 140 may include holes 146 to be aligned with the holes 116 of the base member 110 when the first end 122 of the extension member 120 is received in the passage 111. Similarly, the first surface 131 of the bottom portion 130 may include holes 136 to be aligned with the holes 116 of the base member 110 and the holes 146 of the upper portion 140 when the first end 122 of the extension member 120 is received in the passage 111 of the base member 110. Accordingly, the extension member 120 may be coupled to the base member 110 using fasteners 160 which may be secured using nuts 161 which may be MIG or projection welded to the outer surface of the base member 110 once the fasteners 160 are inserted through the holes 146, 116 and 136 of the respective components and the nuts 161 are tightened. Accordingly, the design and construction of the front blocker structure 100 according to the present disclosure provides a bolt on extension member 120 to the base member 110 that may allow for more flexible assembly options.

In one exemplary embodiment according to the present disclosure, the front blocker structure 100 may further include a body mounting pad, support, member or structure 170 coupled to the body mount bracket 150. The body mounting support 170 may include a passage 172 extending through the body mounting support 170 and aligned with the hole 155 of the body mounting bracket 150. The body mounting support 170 may include any known or appropriate material and may preferably be made from an appropriately resilient yet sufficiently strong material for securely mounting the body 7 to the vehicle frame 10 while also helping to properly insulate the occupant compartment 5 of the body 7 from forces transferred form the vehicle frame 10.

In one particular exemplary embodiment according to the present disclosure, the extension member 120 may be coupled to the base member 110 at any appropriate time during the vehicle assembly process. In one exemplary embodiment, the extension member 120 may be coupled or assembled to the base member 110 during the manufacturing and assembly of the vehicle frame 10. In one particular exemplary embodiment according to the present disclosure, the extension member 120 may be separately produced from the production of the vehicle frame 10 and assembled to the vehicle frame 10 at any time prior to the body 7 being assembled to the vehicle frame 10. More particularly, the extension member 120 may be assembled to the vehicle frame 10 after the vehicle frame 10 has been produced and transported to the vehicle assembly plant where the body 7 may be assembled to the vehicle frame 10.

In one exemplary embodiment according to the present disclosure, the production of the vehicle frame 10 and the assembly of the vehicle 1 may include the process step of assembling the extension member 120 of the front blocker structure 100 to the base member 110 after the vehicle frame 10 has been transported to the assembly plant form the vehicle frame product plant or location. As indicated, the extension member 120 is coupled to the base member 110 using fasteners 160. In this manufacturing scenario, it is possible to produce the vehicle frames 10 including the base members 110 welded to the side frame rails 11 and 12 in a first vehicle frame manufacturing or production location and then ship the vehicle frames 10 to another location such as a vehicle assembly plant. The vehicle frames 10 may be stacked vertically and then the stacks of vehicle frames 10 may be loaded on a rail car or other carrier for shipping between locations. To reduce the costs of shipping it is desirable to have the stacks of vehicle frames 10 located as closely as possible together. In this particular exemplary embodiment, it should be appreciated that since vehicle frame 10 is shipped without the extension member 120 coupled to the base member 110 there will be no loss in the shipping density of the stacks of vehicle frames 10 on the rail car. Accordingly, in the present exemplary embodiment, the base members 110 are welded to the side frame members 11 and 12 during the assembly and production of the vehicle frame 10 and the base members 110 are sized such that the first end 112 of the base member 110 extends outboard of the side frame members 11 and 12 only a limited distance such that multiple vehicle frames 10 may be stacked for shipping to the vehicle assembly plant without any loss to the stacking density of the stacks of vehicle frames 10 as compared to the stacking density of the stacks of vehicle frames before the inclusion of the front blocker structure 100 according to the present disclosure. The same principles may also be applied to the other blocker structures of the exemplary embodiments of the present disclosure.

In one alternate exemplary embodiment according to the present disclosure, it may be noted that it is possible for both the base member 110 and the extension member 120 to be assembled to the vehicle frame 10 at the vehicle assembly plant after the vehicle frames 10 have been shipped to the vehicle assembly plant without any loss in the stacking density of the vehicle frames 10. In one alternate exemplary embodiment, the vehicle frame 10 may be produced with the multiple openings 41 and 51 in the side frame rails 11 and 12 and then the base members 110 may be coupled to the side frame rails 11 and 12 at the vehicle assembly plant. This alternate construction and method of production for the front blocker structure 100 has particular utility when a one-piece front blocker structure may be desired.

Figure 11:
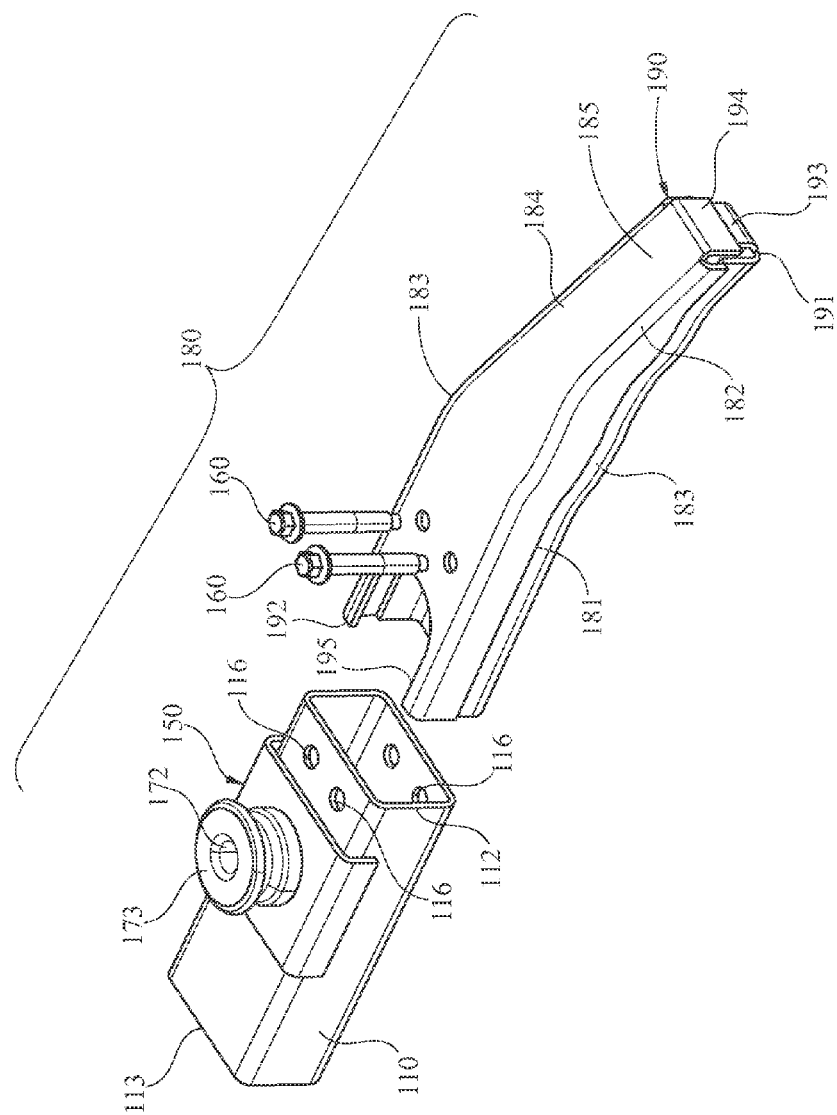
FIG. 11 is a partially exploded, perspective view detailing the components of a front blocker structure of an exemplary embodiment of the present disclosure.

Referring now in particular to the alternate exemplary embodiment of the present disclosure of FIGS. 2 and 11, there is disclosed a front blocker structure 180. The front blocker structure 180 may generally be similar in overall construction and application as the front blocker structure 100. The front blocker structure 180 may include a base member 110, a body mounting bracket 150 and a body support mount 170 that are generally the same as the front blocker structure 100. The front blocker structure 180 may include an extension member 190 having a unique construction as compared to the extension member 120 of the blocker structure 100.

The extension member 190 has a generally rectangular design and generally extends longitudinally and includes a longitudinal axis. The extension member 190 may include a first end 192 including an opening or passage 195 extending distally from the end 192 in a manner similar to the opening 145 in the end 122 of the extension member 120. The extension member 190 may further include holes 196 located distally from the end of the opening 195. The holes 196 may be distally located to be aligned with the holes 116 of the base member 110 when the end 192 of the extension member 190 is received in the passage 111 of the base member 110. The holes 196 may be located in sized appropriately to receive the fasteners 160 for coupling, or bolting on, the extension member 190 to the base member 110. The extension member 190 may include a car forward side 188 including an angle 182 from which and angled portion 185 extends and a car rearward side 189 including an angle 183 from which the angled portion 185 extends toward the end 191. The end 191 of the extension member 190 includes a lower portion 193 which is folded from the bottom surface of the extension member 190 and extends upward and an upper portion 194 which is folded from the top surface of the extension member 190 and extends downward as best shown in FIG. 11. In one exemplary embodiment of the present disclosure, the extension member 190 may preferably be produced as a single piece of high strength or ultrahigh strength sheet metal that may be stamped, punched, folded and formed into the shaped extension member 190 and including a seam 181.

While the vehicle 1 of the present disclosure is shown as including both a front blocker structure 100 and a rear blocker structure 200, it should be understood that it is possible to include either and/or both of the blocker structures on the vehicle as may be desired or appropriate for managing the crash forces and movement of the tire 3 during the offset frontal impact to the vehicle 1 to limit intrusion into the passenger compartment 5. Generally, the rear blocker structure 200 may be designed and constructed in a manner similar to the front blocker structure 100. The rear blocker structure 200 may be coupled to the left-hand and right-hand side frame rail members 11 and 12, respectively, of the vehicle frame 10. The left-hand frame rail member 11 may again include the opening 41 in which and end of the rear blocker structure 200 may be inserted and passed through the left-hand frame rail member 11. The end of the rear blocker structure 200 may be coupled to the left-hand frame rail 11 using a MIG welding process. Referring now in particular to FIGS. 2 through 5 and 12, there is disclosed in more detail the rear blocker structure 200 according to an exemplary embodiment of the present disclosure.

The rear blocker structure 200 may include a base member 210 which is shown in phantom lines in FIG. 12 to better show the coupling of an extension member 230 of the blocker structure 200 to the base member 210. The base member 210 includes an end 212 and has a generally square cross-section tubular shape including an opening or passage 211 extending between the ends of the base member 210. The base member 210 extends longitudinally and may include a bend or angle 205 along its longitudinal axis. The bend 205 is located outboard of the side of the left-hand frame rail 11 and aligns the end 212 of the base member and therefore the extension member 230 in a direction to avoid interfering with the envelope of the wheel 2 defined by the movement of the wheel 2 during normal operation of the vehicle 1. The extension member 230 may be a generally rectangular or square cross-section tubular shaped member including a passage extending from a first end 231 to a second end 232 which is inserted in the passage 211 of the base member 210. The extension member 230 may generally have any shaped cross-section appropriate for the noted application. The extension member 230 may have a generally longitudinal extent including a longitudinal axis. The extension number 230 includes a first portion 233 including a first portion of the longitudinal axis and a second portion 234 including a second portion of longitudinal axis. The first portion 233 is angularly offset from the second portion 234 by a bend 235. Accordingly, the longitudinal axis of the first portion 233 is also angularly offset from the longitudinal axis of the second portion 234. The sizes and angles of the first and second portions 233 and 234, respectively, and the bend 235 are selected to locate the second blocker structure 200 proximal the envelope of the wheel 2 so that the second blocker structure 200 is only engaged by the wheel 2 due to an impact to the vehicle 1 causing the wheel 2 to be moved toward and engage the rear blocker structure 200 which, being coupled unanchored in the frame rail 11, limits the movement of the wheel 2 toward the passenger compartment 5 of the body 7.

The base member 210 and the extension member 230 each include holes (not shown) for receiving the bolts are fasteners 260 for coupling or bolting on the extension member 230 to the base member 210. Similar to the front blocker structure 100, the bolt on feature and structure of the rear blocker structure 200 allows the extension number 230 to be coupled to the base member 210 at the vehicle assembly plant and therefore allows for the continued use of the existing vehicle frame 10 transportation resources and maintaining the existing vehicle frame 10 shipping density. The use of the bolt on extension member 230 to the base member 210 further allows for continued use of the suspension alignment units and the existing frame and pedestal lines in the vehicle assembly plant. The rear blocker 200 may include the bolt on the clip 240 located in the passage 211 of the base member 210 as best shown in FIGS. 12 and 12A.

The clip or support member 240 may be a generally planar sheet metal piece of material including a first formed end 241 and a second formed end 242 separated by a middle or bight portion 243. The ends 241 and 242 of the clip support 240 are formed to include generally circular or round-shaped passages 245 and 246, respectively, for providing a passage between the hole in the upper surface of the base member 210 and the hole in the lower surface of the base member 210 so that the shank of the fastener 260 may be easily and accurately passed through the passage 211 of the base member 210. In particular, the clip support 240 may be located in the passage 211 of the base member 210 and extend substantially between the upper surface and the lower surface of the passage 211 and may be welded in place using any known or appropriate weld type or process. The clip support 240 may provide additional support to the tubular structures of the base member 210 and the extension member 230 to allow the fasteners 260 to be torqued sufficiently tight without impairment to the members 210 and 230, respectively, and their connection. It is contemplated that the clip support 240 may be used with any of the blocker structures 100, 180, and 200 of the present disclosure. The bolt on front and rear blocker structures 100 and 200 respectively provide many advantages including the ability to design and implement a more optimal and tunable design by providing ability to select different material thicknesses for the base members 110 and 210 from the extension members 120 and 230, respectively.

Figure 13:
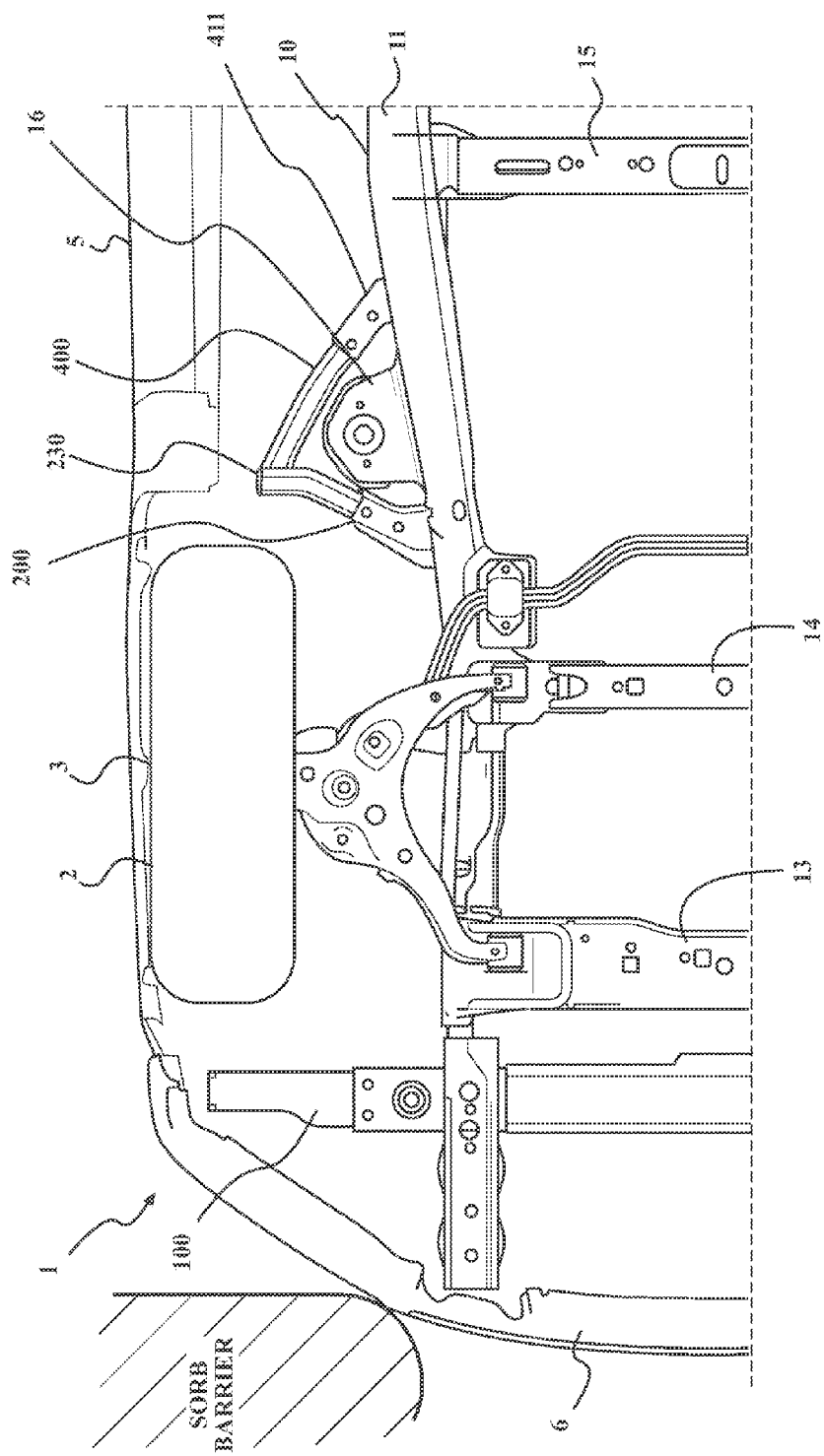
FIG. 13 is a bottom, plan graphic view of a body on frame vehicle including a small offset impact load management system having a reinforcement blocker structure according to an exemplary embodiment of the present disclosure.

The vehicle 1 of the present disclosure may include a small offset impact load management system for managing the transfer of the impact loads from a small offset frontal impact that may include any one of, and any combination of, the blocker structures 100, 180, 200, and 400 of the present disclosure. In a further alternate exemplary embodiment of the present disclosure as best shown in FIGS. 13 through 15, the body on frame vehicle 1 may further include a reinforcement blocker structure 400 as part of the small offset impact load management system of the vehicle 1. The reinforcement blocker structure 400 may be located in a hole 411 and coupled to the left-side frame rail 11 (and also in the right-side frame rail 12 (not shown)) using any known or appropriate coupling device or mechanism, including welding, similar to any of the other blocker structures 100, 180 and 200. The hole 411 in the frame rail 11, and the reinforcement blocker structure 400, may preferably be located rearward and distal the front wheel 2 and tire 3 and the small offset impact load management system for managing the transfer of an impact load from the front wheel 2 and tire 3 of the vehicle during a small offset frontal impact to the vehicle 1 as best shown in FIG. 15. The reinforcement blocker structure 400 may also be located distal from the first rear blocker structure 200 and proximal the cross frame member 15 and may preferably extend outwardly from the side frame rail 11 and angularly forward (in a direction toward the vehicle forward direction), and toward the rear blocker structures 200 as best shown in FIGS. 13 and 14.

In one particular embodiment of the present disclosure, the small offset impact load management system may further include two rear blocker structures 200, as best shown in FIG. 14. In certain body on frame vehicles 1, where the mass of the vehicle becomes relatively high, it becomes appropriate to include multiple rear blocker structures 200 for appropriately managing the impact force loads during a SORB type impact to the front bumper 6 of the body on frame vehicle 1. In one exemplary embodiment of the present disclosure, a first or upper rear blocker 200 is coupled to the frame rail 11 and a second or lower rear blocker 200 is also coupled to the frame rail 11 slightly rearward of the first upper blocker structure 200.

The reinforcement blocker structure 400 is substantially similar in design and construction to the rear blocker structures 200, and may include a base member 410 coupled to the vehicle frame rail 11. The base member 410 may have a generally square cross-section tubular shape including an opening or passage 411 extending between the ends of the base member 410. The base member 210 extends generally longitudinally outward from the frame rail 11 and may include a bend or angle 405 along its longitudinal axis in a generally vehicle forward direction. The bend 405 may be located outboard of the outer side of the left-hand frame rail 11. The reinforcement blocker structure may further include an extension member 430 coupled to the base member 410 and extending generally longitudinally toward the ends of the upper and lower rear blocker structures 200 and toward the wheel 2 and tire 3.

The extension member 430 may be a generally rectangular or square cross-section tubular shaped member including a passage extending from a first end to a second end which is inserted in the passage 411 of the base member 410, although the extension member 430 may generally have any shaped cross-section appropriate for the application. Referring in particular to FIGS. 13 and 15, it may be noticed that the vehicle 1 has impacted the SORB barrier which has moved the wheel 2 and tire 3 rearward and into the upper and lower rear blocker structures 200 and the wheel 2 and tire 3 have engaged the reinforcement blocker structure 400 as the side frame rail 11 has bent inward generally proximal the cross frame member 15.

As the wheel 2 and tire 3 engage the reinforcement blocker structure 400 and the frame rail 11 bends during the SORB impact, the reinforcement blocker structure 400 functions to manage the transfer of the impact forces and direct them in a cross vehicle direction by transferring the impact forces to the frame rail 11 and the cross frame member 15 which dissipates the energy of the impact into the vehicle frame 10 and thereby reducing and limiting the movement of the wheel 2 and tire 3 further toward the passenger compartment 5 of the body 7 of the vehicle 1.

Testing of model vehicles 1 including the small offset impact load management system of the exemplary embodiments of the present disclosure is valid and indicates a surprisingly significant reduction in the amount of passenger compartment 5 intrusion from the wheel 2 and tire of the vehicle 3. The small offset impact load management system, in particular the reinforcement blocker structure 400 exhibits successful management of SORB loads and assists in controlling intrusion of the dash and lower passenger compartment by transferring impact energy to the opposite side of the vehicle 1. Further, it is contemplated that the small offset impact load management system and the reinforcement blocker structure 400 may be implemented in a vehicle 1 in a variety of embodiments with existing vehicle frame 10 components and other vehicles components and systems.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, for example, "about 20 to 30" is intended to cover "about 20 to about 30", inclusive of at least the specified endpoints unless otherwise stated.

The use of the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which such claims are entitled. Any disclosure of an article or reference, including patent applications and publications, is incorporated by reference herein for all purposes. Any omission in the following claims of any aspect of subject matter disclosed herein is not a disclaimer of such subject matter.

We claim:

1. A small offset impact load management system for use in a vehicle including a front wheel and tire and a vehicle frame having first and second side frame rails and a cross frame member located rearward and distal the front wheel and tire, the small offset impact load management system for managing the transfer of an impact load from the front wheel and tire of the vehicle during a small offset frontal impact to the vehicle, the small offset impact load management system comprising:
   a. a front blocker structure for coupling to the first side frame rail at a location forward of and proximal the front wheel and tire of the vehicle, the front blocker structure extending outward from the side frame member;
   b. a first rear blocker structure for coupling to the first side frame rail at a location rearward and proximal the front wheel and tire of the vehicle, the first rear blocker structure extending outward from the first side frame rail;
   c. a reinforcement blocker structure for coupling to the first side frame rail at a location rearward and distal the front wheel and tire of the vehicle and distal from the first rear blocker structure and proximal the cross frame member, the reinforcement blocker structure extending angularly outward from the first side frame rail and in a direction toward the front wheel and tire of the vehicle; and
   d. wherein the front blocker structure and the first rear blocker structure are to be located and aligned to first limit the movement of the front wheel and tire toward the body of the vehicle when the vehicle has a small offset frontal impact and further wherein the reinforcement blocker structure is to be located and aligned to engage the wheel and tire after the front blocker structure and the first rear blocker structure during the small offset front impact to further limit the movement of the wheel and tire toward the body of the vehicle by transferring impact forces from the wheel and tire to the cross frame member of the vehicle frame.

2. The small offset impact load management system of claim 1 further comprising a second rear blocker structure for coupling to the first side frame rail proximal the first rear blocker at a location rearward and proximal the front wheel and tire of the vehicle, the second rear blocker structure extending outward from the first side frame rail.

3. A body on frame vehicle including a small offset impact load management system, the body on frame vehicle comprising:
   a. a vehicle frame having first and second side frame rails and a cross frame member located rearward and distal the front wheel and tire, the small offset impact load management system for managing the transfer of an impact load from the front wheel and tire of the vehicle during a small offset frontal impact to the vehicle;
   b. a front wheel and tire coupled to the vehicle;
   c. wherein the small offset impact load management system comprises:
      i. a front blocker structure coupled to the first side frame rail at a location forward of and proximal the front wheel and tire of the vehicle, the front blocker structure extending outward from the first side frame rail;
      ii. a first rear blocker structure coupled to the first side frame rail at a location rearward and proximal the front wheel and tire of the vehicle, the first rear blocker structure extending outward from the first side frame rail; and iii. a reinforcement blocker structure coupled to the first side frame rail at a location rearward and distal the front wheel and tire of the vehicle and distal from the first rear blocker structure and proximal the cross frame member and wherein the reinforcement blocker structure extends angularly outward from the first side frame rail and in a direction toward the front wheel and tire of the vehicle; and d. wherein the front blocker structure and the first rear blocker structure are located and aligned to first limit the movement of the front wheel and tire toward the body of the body on frame during a small offset frontal impact and further wherein the reinforcement blocker structure is located and aligned to engage the wheel and tire after the front blocker structure and the first rear blocker structure to further limit the movement of the wheel and tire toward the body of the body on frame vehicle by transferring impact forces from the wheel and tire to the cross frame member of the vehicle frame.

4. The body on frame vehicle of claim 3 wherein the small offset impact load management system further comprises a second rear blocker structure coupled to the first side frame rail proximal the first rear blocker structure and extending outward from the first side frame rail.

* * * * *